April 12, 1955
A. CLARK
2,706,211
HYDROCARBON POLYMERIZATION AND HYDROGENATION
PROCESS CATALYZED BY NICKEL OXIDE
Filed April 28, 1952
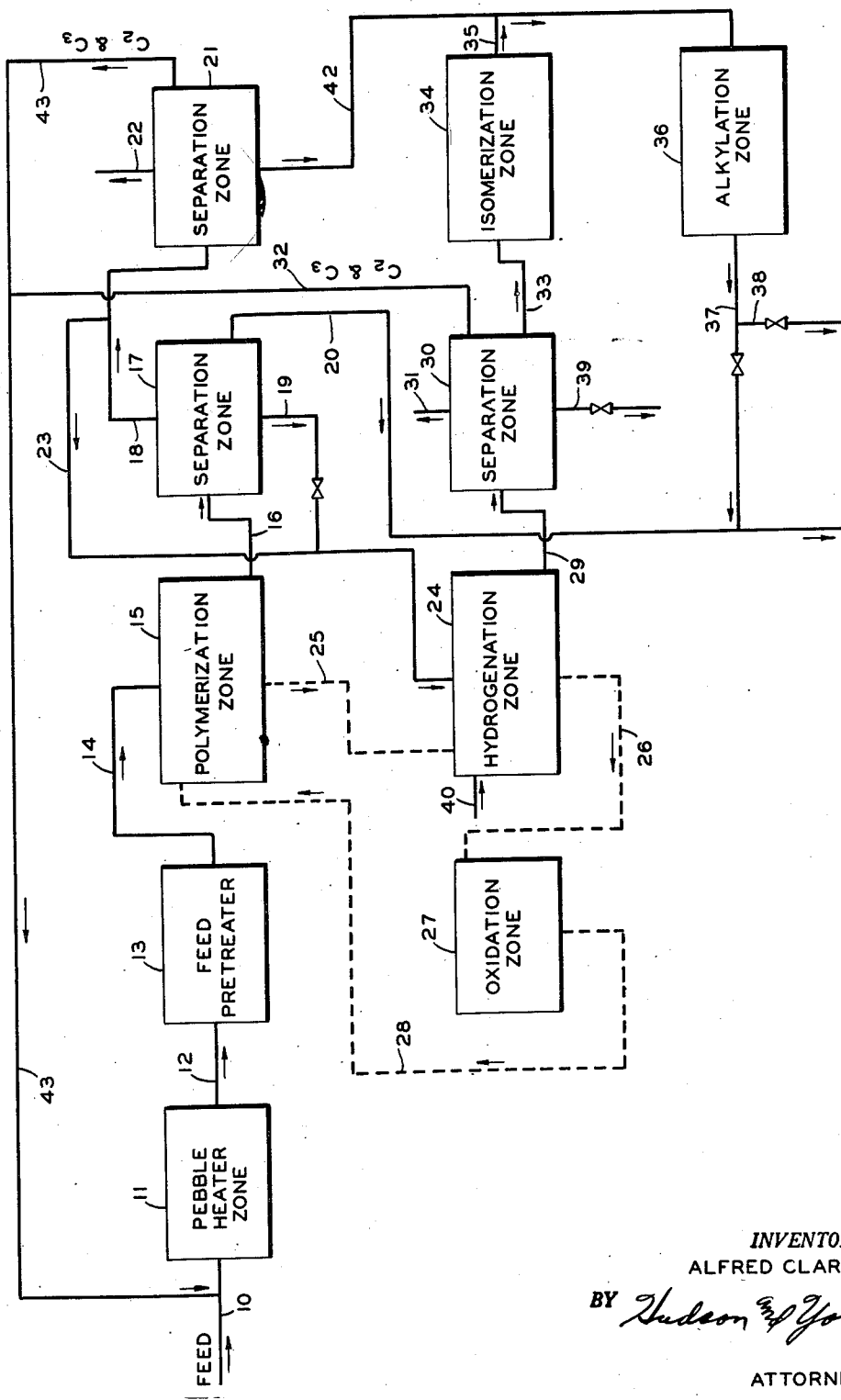
INVENTOR.
ALFRED CLARK
BY *Hudson & Young*
ATTORNEYS

United States Patent Office 2,706,211
Patented Apr. 12, 1955

2,706,211

HYDROCARBON POLYMERIZATION AND HYDROGENATION PROCESS CATALYZED BY NICKEL OXIDE

Alfred Clark, Bartlesville, Okla., assignor to Phillips Petroleum Company, a corporation of Delaware Application April 28, 1952, Serial No. 284,749

14 Claims. (Cl. 260—683.15)

This invention relates to the catalytic conversion of hydrocarbons in the presence of a nickel oxide-containing catalyst. One aspect of the invention is concerned with the polymerization of olefins with a nickel oxide-containing catalyst and utilization of the partially deactivated catalyst from the polymerization in the hydrogenation of unsaturated hydrocarbons before reactivation of the catalyst.

The process of polymerization of ethylene and other low boiling olefins in the presence of a catalyst comprising essentially nickel oxide on a support such as silica or silica-alumina has been described in U. S. Patents 2,381,198 and 2,581,228 to Grant C. Bailey et al., and in the patentee's application Serial No. 599,536, filed June 15, 1954, now U. S. Patent 2,606,940, issued August 12, 1952. The details of the polymerization step of this invention are adequately set forth in the above-identified patents; however, an additional specific disclosure with respect to the polymerization step is set forth hereinafter.

It is an object of this invention to provide a two-step catalytic polymerization and hydrogenation process which effects greater utilization of the polymerization catalyst. Another object is to increase the utility of a nickel oxide-containing polymerization catalyst between regenerations. Another object of the invention is to provide a polymerization and hydrogenation process which produces valuable hydrocarbon constituents of motor fuel. A further object is to provide an efficient process for the utilization of a cracked hydrocarbon stream containing substantial amounts of ethylene and other light olefins. Other objects of the invention will become apparent from a consideration of the accompanying disclosure.

This invention broadly comprises the steps of polymerizing ethylene and/or other low boiling olefins to polymers thereof in the presence of a catalyst comprising nickel oxide on a suitable support, subsequently utilizing the catalyst from the polymerization step in the hydrogenation of hydrogenatable olefinic hydrocarbons, followed by regeneration of spent nickel-containing catalyst by subjecting the same to oxidation, and returning the regenerated catalyst to the polymerization step. Numerous specific embodiments of this general process may be utilized in which, for example, hydrogenation of a portion of the product of the polymerization step is effected and the resulting products suitably utilized. Several possible modifications are described hereinafter.

A more complete understanding of the invention may be obtained by referring to the drawing which is a schematic flow of one modification or embodiment of the invention. A feed comprising ethane and/or propane enters the system through line 10 and is conducted to pebble heater zone 11 wherein the gases are cracked under conventional conditions and in conventional manner to produce a stream of high ethylene content. This stream is then passed through line 12 to feed pre-treater zone 13 which contains a first section in which the feed is contacted with copper oxide to remove principally acetylene and a second section in which the acetylene-free feed in contacted with hopcalite in accordance with the disclosure of application Serial No. 275,824 of J. P. Hogan et al. Other feed purification treatments may be effected without departing from the scope of the invention.

The principal object of the purification treatment is to remove acetylene, carbon monoxide, butadiene, hydrogen sulfide and other deleterious materials, or to convert them to innocuous compounds which are not damaging to the nickel oxide catalyst with which the feed is subsequently contacted. The purified stream which comprises predominantly ethylene and hydrogen is conducted to polymerization zone 15 by means of line 14. Polymerization zone 15 encloses a catalyst comprising nickel oxide on a suitable support such as silica gel which is preferably impregnated with from 1–75 weight per cent alumina. The most effective catalyst for the polymerization step is prepared by the method described in the U. S. Patent to Bailey et al., 2,581,228.

In polymerization zone 15, the ethylene and other low boiling olefins are polymerized to butenes and higher boiling olefins, and the polymerization zone effluent is conducted through line 16 to separation zone 17. In zone 17 the stream is separated into a $C_4$ and lighter fraction and a normally liquid polymer fraction, with the normally liquid material being drawn off through line 20 as a product of the process. The $C_4$ and lighter material is removed from zone 17 through line 18, and a portion of this stream is conducted through line 23 to hydrogenation zone 24. During the polymerization step effected in zone 15 the catalyst gradually becomes less active or partially deactivated to such an extent that it is no longer economical to continue the polymerization step without reactivating the catalyst. Upon partial deactivation of the catalyst in polymerization zone 15, the partially deactivated catalyst is transferred to hydrogenation zone 24 and is replaced in zone 15 with freshly activated catalyst or with new catalyst. When utilizing fluidized catalyst technique the deactivated catalyst is transferred from zone 15 through line 25 to zone 24.

The olefin content of the stream in line 23 which may consist principally of ethylene, propylenes, and butylenes, is hydrogenated by the hydrogen contained in this stream in the presence of the partially deactivated catalyst present in zone 24. Additional hydrogen may be introduced through line 40 when expedient.

As the hydrogenation in zone 24 continues, the catalyst therein becomes sufficiently deactivated for the hydrogenation step that it becomes uneconomical to further utilize this catalyst without subjecting the same to a regeneration treatment. When this catalyst condition occurs the catalyst is transferred through line 26 or by other means to oxidation zone 27 in which the catalyst is treated with an oxygen-containing gas at combustion temperatures so as to remove oxidizable deleterious materials deposited on the catalyst during use in zones 15 and 24 and to reoxidize and/or reactivate the nickel-containing catalyst and thereby restore the active nickel oxide thereof. The regenerated or reactivated catalyst is transferred by means of line 28 or by other means to polymerization zone 15 when the catalyst in polymerization zone 15 becomes sufficiently deactivated, rendering it expedient to replace the same with freshly activated catalyst.

The effluent of hydrogenation zone 24, comprising predominantly hydrogen, ethane, propane, and n-butane, is removed through line 29 and conducted to separation zone 30 wherein the lighter-than-ethane material is removed through line 31 to suitable utilization, while ethane and any small amounts of propane are removed through line 32 which conducts the same to line 43, referred to hereinafter. The n-butane from zone 24 is removed from separation zone 30 by means of line 33 which feeds the same into isomerization zone 34. In this isomerization zone the n-butane is converted by conventional means to isobutane which is removed therefrom through line 35, for treatment hereinafter described.

The portion of the butene and lighter stream not removed from line 18 is conducted to separation zone 21 wherein the lighter-than-ethylene material is removed through line 22 to suitable utilization. The $C_2$ and $C_3$ fraction separated in zone 21 is removed through line 43 and is combined with the similar stream carried in line 32; and the combined stream is conducted to line 10 to join the feed to pebble heater zone 11. The n-butenes are removed from zone 21 through line 42 and are combined with the isobutane carried by line 35. This combined isobutane-butenes stream is conducted to alkylation zone 36 which may be a catalytic alkylation zone utilizing anhydrous hydrofluoric acid, sulfuric acid, or other similar and effective catalyst. The alkylate formed in zone 36 is removed through line 37 and may be withdrawn as a product of the process through line 38. It may, however, be conducted through line 37 to line 20 where it is mixed or blended with a polymer stream in line 20 to produce a high grade motor fuel.

In one modification of this process, separation zone 17 may be operated in such a manner that only light polymers, for example $C_6$ and $C_8$ polymers, are withdrawn through line 20 and heavier polymers are withdrawn through line 19 and conducted to line 23 for transfer to hydrogenation zone 24 wherein these heavier polymers are hydrogenated to paraffins. In this embodiment, the effluent from zone 24 contains normally liquid paraffins which are conducted along with the lighter materials through line 29 to zone 30 wherein the heavy paraffins are withdrawn by means of line 39 and may be utilized as high performance jet fuels. Line 20 thus carries only light polymers and when blended with the alkylate from zone 36, produces a highly desirable motor fuel. A fuel such as is produced in this modification has a great many high research octane olefins in the low boiling portion of the gasoline and is predominantly high ASTM octane number paraffins in the higher boiling portion of the fuel. Thus, the fuel has excellent performance characteristics in high compression engines at both low and high speeds.

Polymerization zone 15 is operated principally in the temperature range of 50–175° F., and more effectively in the range of 75–125° F. The space velocity at which the feed is charged to the polymerization zone is in the range of 100 to 1000 volumes per volume of catalyst per hour and is preferably in the range of 300 to 800 v./v./hr. When using a feed rich in ethylene the part pressure of the ethylene is regulated in the range of 40 to 1000 p. s. i. and preferably in the range of 100 to 600 p. s. i.

In hydrogenation zone 24 a temperature in the range of 125 to 400° F. and preferably in the range of 175 to 350° F. is maintained. The pressure in this zone is at least 50 p. s. i. and preferably in the range of 150 to 500 p. s. i. The feed rate is approximately the same as in zone 15.

In oxidation zone 27 the temperature is maintained in the range of 100 to 900° F. As the oxidation of the nickel in the catalyst takes place quite readily and is highly exothermic, it is quite desirable to effect this oxidation with dilute air in order to provide adequate temperature control. Zone 27 is operated at pressures of atmospheric or higher; and the pressure level is usualy only that sufficient to give good control.

The other zones described and shown on the drawing are operated in conventional manner and under conditions well known to those skilled in the art.

In the above described process the nickel oxide catalyst utilized in the polymerization zone undergoes partial reduction under the reducing conditions of that zone and as it becomes reduced and thereby partially deactivated for the polymerization reaction it is removed to hydrogenation zone 24 for utilization of its hydrogenating activity. On continued use in the hydrogenation zone the hydrogenating activity of the catalyst declines to an undesirably low level at which point it is removed and regenerated in oxidation zone 27 from which it is returned to the polymerization zone as freshly activated polymerization catalyst. By this sequence of utilization, the changing characteristics of the catalyst are utilized to their fullest extent and the minimum amount of regeneration is required. The advantages of this sequence are thus readily apparent.

Various other specific modifications of this invention will be apparent to those skilled in the art and modification of the broad process may be effected in order to fit specific applications encountered.

It will, of course, be obvious to those skilled in the art that cyclic operation of the polymerization zone, dehydrogenation zone, and oxidation zone may be utilized when desired. By this expedient, fixed beds of the catalyst may be used and movement of the catalyst between zones obviated. In this manner, a series of catalyst-containing zones are utilized in sequence as polymerization, hydrogenation, and regeneration zones. Suitable manifolding of the various chambers is conventional and within the skill of the art.

The following specific examples are illustrative of the process but should not be interpreted as imposing unnecessary limitations on the invention.

EXAMPLE I

A silica-alumina-nickel oxide catalyst containing 4 per cent by weight of nickel was utilized as the catalyst in polymerizing ethylene in a feed consisting essentially of 55 per cent hydrogen and 45 per cent ethylene (volume per cent). A pressure of 300 p. s. i. and a feed rate of 600 v./v./hr. with a reaction zone temperature of 100° F. were utilized in the process. The product composition is shown in the following table. The octane number (Research) of the gasoline boiling range material is approximately 90.

*Table*

PRODUCT COMPOSITION

|  | Once-through |
|---|---|
| Net total product, volume per cent: |  |
|   Butenes | 50 |
|   $C_6+$ | 50 |
| Distribution of $C_6+$, volume per cent: |  |
|   $C_6$ | 31 |
|   $C_8$ | 26 |
|   $C_{10}$ | 22 |
|   $C_{12}+$ | 21 |
| Composition of fractions, volume per cent: |  |
|   $C_4$: |  |
|     1-butene | 10 |
|     2-butene | 90 |
|   $C_6$: |  |
|     2-hexene | 40 |
|     3-hexene | 25 |
|     3-methyl-1-pentene | 5 |
|     3-methyl-2-pentene | 30 |
|   $C_8$: |  |
|     n-Octenes | 20 |
|     Ethylhexenes | 35 |
|     Dimethylhexenes | 40 |
|     Methylethylpentenes | 5 |

EXAMPLE II 48 cc. of partially deactivated nickel oxide polymerization catalyst and 100 cc. of a hexene fraction from the nickel oxide catalyzed polymer of $$C_2H_4 \text{ (d.}=0.677 \text{ g./cc.; Br. No.}\cong 160)$$

were charged to a bomb mounted on a motor-driven rocker. The bomb was pressured to 100 p. s. i. g. with $H_2$. Heating was begun and after about 31 minutes, the pressure, which had risen to 175–200 p. s. i. g. because of the increased temperature, started to drop, indicating hydrogenation of the polymer; the temperature at this point was about 239° F. Heating was continued for an additional 89 minutes with periodical pressuring to 175–200 p. s. i. g. with $H_2$; the temperature was 275–311° F. The heating was then stopped and the product withdrawn from the bomb. The bromine number of the product was 3.9, indicating 2 per cent unsaturation. Hence approximately the product from the hydrogenation was 98 per cent saturated.

From the foregoing description of the invention it can be seen that the same provides a novel and unique process, in its several modifications, which effects the production of valuable hydrocarbon products such as high performance motor fuel for high compression motors, jet fuel, and various high grade blending stocks and with extremely economical catalyst utilization. Certain modifications of the invention will become apparent to those skilled in the art and the illustrative details disclosed are not to be construed as imposing unnecessary limitations on the invention.

I claim:

1. A process for the conversion of hydrocarbons which comprises the steps of contacting a freshly activated nickel oxide-containing catalyst with a polymerizable hydrocarbon feed under polymerizing conditions so as to produce hydrocarbon polymer; continuing the polymerizing until said catalyst is partially deactivated to such an extent that it is no longer economical to continue the polymerization step without reactivating the catalyst; thereafter contacting said catalyst in partially deactivated condition with hydrogenatable hydrocarbon feed under hydrogenating conditions so as to hydrogenate same; continuing the hydrogenating until said catalyst is substantially less active than at the start of said hydrogenating;

thereafter reactivating said catalyst so as to form freshly activated catalyst; and recovering product from the polymerizing step and from the hydrogenating step.

2. A process for the conversion of hydrocarbons which comprises the steps of contacting a freshly activated nickel oxide-containing catalyst with a polymerizable hydrocarbon feed under polymerizing conditions so as to produce hydrocarbon polymer; continuing the polymerizing until said catalyst is partially deactivated to such an extent that it is no longer economical to continue the polymerization step without reactivating the catalyst; thereafter contacting said catalyst in partially deactivated condition with hydrogenatable hydrocarbon feed under hydrogenating conditions so as to hydrogenate same; continuing the hydrogenating until said catalyst is substantially less active than at the start of said hydrogenating; thereafter reactivating said catalyst so as to form freshly activated catalyst; again contacting said freshly activated catalyst with polymerizable hydrocarbon so as to produce hydrocarbon polymer; and recovering product from the polymerizing step and from the hydrogenating step.

3. The process of claim 2 in which said polymerizable hydrocarbon is an ethylene-rich feed which is converted principally to straight chain olefinic polymer.

4. The process of claim 3 in which the catalyst consists essentially of nickel oxide deposited in minor amounts on silica-alumina, said catalyst having been activated at a temperature in the range of 350 to 750° F.

5. A process for the conversion of hydrocarbons which comprises the steps of contacting a freshly activated nickel oxide on silica-alumina catalyst with a normally gaseous olefin feed under polymerizing conditions including a temperature in the range of 50 to 175° F., a space velocity in the range of 100 to 1000 v./v./hr., and a pressure in the range of 40 to 1000 p. s. i. so as to produce straight chain hydrocarbon polymer; continuing the polymerizing until said catalyst is partially deactivated to such an extent that it is no longer economical to continue the polymerization step without reactivating the catalyst; thereafter contacting said catalyst in its partially deactivated condition at the end of the polymerizing step with a hydrogenatable hydrocarbon under hydrogenating conditions so as to hydrogenate same; continuing the hydrogenating step until said catalyst is substantially less active than at the start of the hydrogenating step; thereafter reactivating said catalyst so as to form freshly activated catalyst; again contacting said freshly activated catalyst with a normally gaseous olefin feed as in the first step; and recovering hydrocarbon polymer and hydrogenated hydrocarbon from the process.

6. The process of claim 5 in which the normally gaseous olefin feed is rich in ethylene.

7. The process of claim 5 in which the normally gaseous olefin feed is rich in propylene.

8. The process of claim 5 in which the normally gaseous olefin feed is principally ethylene and propylene.

9. A process for the conversion of hydrocarbons which comprises the steps of contacting a freshly activated nickel oxide on silica-alumina catalyst with a normally gaseous olefin feed under polymerizing conditions, including a temperature in the range of 50 to 175° F., a space velocity in the range of 100 to 1000 v./v./hr., and a pressure in the range of 40 to 1000 p. s. i. so as to produce straight chain hydrocarbon polymer; continuing the polymerizing until said catalyst is partially deactivated to such an extent that it is no longer economical to continue the polymerization step without reactivating the catalyst; separating the effluent from the polymerizing step into a lighter than $C_6$ olefinic fraction and a normally liquid olefinic fraction; contacting said catalyst in its partially deactivated condition with at least a portion of said lighter than $C_6$ olefinic fraction in the presence of $H_2$ under hydrogenating conditions including a temperature in the range of 125 to 400° F., a space velocity in the range of 100 to 1000 v./v./hr., and a pressure in the range of 50 to 500 p. s. i. so as to hydrogenate at least a portion of said fraction; continuing the hydrogenating step until said catalyst is less active than at the start of said hydrogenating step; thereafter reactivating said catalyst by subjecting same to oxidizing conditions so as to restore the activity of same to substantially its original activity at the start of the polymerizing step; again contacting the freshly activated catalyst with normally gaseous olefin feed as in the first step; and recovering normally liquid hydrocarbon polymer and hydrogenated hydrocarbon from the process.

10. The process of claim 9 in which at least a portion of the n-butenes formed in the polymerization step are recovered, at least a portion of the n-butane formed in the hydrogenation step is recovered and isomerized to i-butane, said n-butenes and i-butane are alkylated, and the alkylate is recovered as a product of the process.

11. The process of claim 10 in which said alkylate is blended with said normally liquid olefinic fraction to produce a high grade motor fuel.

12. A process for the conversion of hydrocarbons which comprises the steps of contacting a freshly activated nickel oxide-containing catalyst with a polymerizable hydrocarbon feed under polymerizing conditions so as to produce hydrocarbon polymer; continuing the polymerizing until said catalyst is partially deactivated to such an extent that it is no longer economical to continue the polymerization step without reactivating the catalyst; separating the effluent from the polymerizing step into a lighter than $C_6$ olefinic fraction, a $C_6$–$C_8$ olefinic fraction, and a heavier than $C_8$ olefinic fraction; contacting at least a portion of said heavier than $C_8$ olefinic fraction with the partially deactivated catalyst from the polymerizing step in the presence of $H_2$ under hydrogenating conditions so as to hydrogenate at least a portion of said fraction to form heavier than $C_8$ paraffin high performance jet fuel and recovering same as a product of the process; continuing the hydrogenating until said catalyst is substantially less active than at the start of said hydrogenating; and thereafter reactivating said catalyst so as to form freshly activated catalyst and again contacting same with polymerizable hydrocarbon feed.

13. The process of claim 12 in which at least a portion of the butenes are recovered from said lighter than $C_6$ olefinic fraction and alkylated with isoparaffin to form an alkylate suitable for blending with said $C_6$–$C_8$ olefinic fraction to form a high grade motor fuel; and blending said alkylate with said $C_6$–$C_8$ fraction to form said fuel.

14. The process of claim 13 in which said isoparaffin is derived by hydrogenating a portion of the butenes recovered from the effluent from said polymerizing step and then isomerizing the resulting n-butane to i-butane.

References Cited in the file of this patent

UNITED STATES PATENTS

| | | |
|---|---|---|
| 2,181,640 | Deanesly et al. | Nov. 28, 1939 |
| 2,323,570 | Schmitkons | July 6, 1943 |
| 2,381,198 | Bailey et al. | Aug. 7, 1945 |